Sept. 21, 1926.  1,600,449
C. AHLBORN
AUTOMATIC COUPLING FOR MOTOR CARS OR OTHER VEHICLES
Filed Feb. 11, 1926

Inventor:—
Carl Ahlborn
by [signature]
Attorney

Patented Sept. 21, 1926.

1,600,449

UNITED STATES PATENT OFFICE.

CARL AHLBORN, OF HAMBURG, GERMANY.

AUTOMATIC COUPLING FOR MOTOR CARS OR OTHER VEHICLES.

Application filed February 11, 1926, Serial No. 87,519, and in Germany September 16, 1925.

This invention concerns improvements in or relating to automatic couplings for motor-cars or other vehicles.

Automatic coupling provided with a coupling bolt mounted on a horizontal pivot and with devices to prevent play of the coupling hook relatively to the bolt are well known.

According to the present invention one component of the coupling comprises two bolts arranged one in front of the other the front bolt being so pivotally mounted that it will swing away when struck by a link or bow of the coupling member on the vehicle to be attached and in so doing will move the rear bolt to permit the coupling member to pass and allow the bolts to move into their locking positions, one on either side of the link or bow.

Preferably the front bolt is provided with a projection adapted to engage and lift the rear bolt when the former is acted upon by the coupling member of the vehicle to be attached.

The second component of the coupling is suitably a bow-shaped member provided with a recess in its inner surface to receive the coupling bolt when in the coupled position and with an outer curvature and projections which allow for and limit movements of the link or bow member about the front bolt as pivot.

One embodiment of the invention is illustrated, by way of example, in the accompanying drawing in which.

Figure 1:
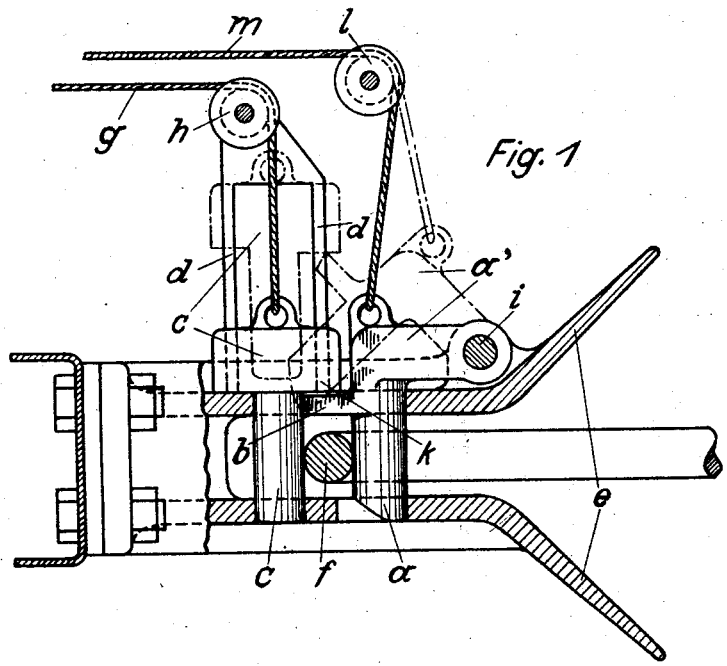
Fig. 1 is a side elevation, partially in section, of a coupling device.
Figure 2:
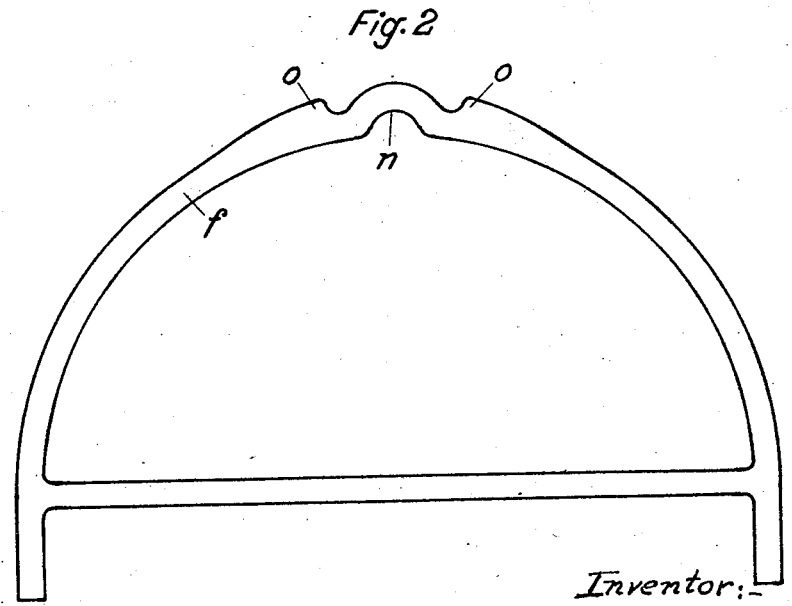
Fig. 2 is a plan view of a bow-shaped coupling member.

The coupling bolt $a$ forms a portion of a bell crank lever $a'$ mounted on a horizontal pivot $i$ and provided with a projection $b$. As the bow-shaped coupling member $f$ moves into the forked member $e$ and lifts the bolt $a$, the projection $b$ engages the under part of the head $k$ of the locking-bolt $c$ and lifts it in guides $d$. The coupling bow $f$ can then pass under the locking-bolt $c$, thus providing sufficient room for the coupling-bolt $a$ to fall back automatically into its original position. As soon as the coupling is subjected to a pull the coupling bow $f$ moves against the coupling bolt $a$ and the bolt $c$ falls in a similar manner into its original position.

For uncoupling, after the locking-bolt $c$ has been lifted by means of the rope $g$ running over the roller $h$, the coupling-bow $f$ is moved thereunder so as to provide sufficient room for the swinging-out of the coupling bolt $a$ which is effected by means of the rope $m$ running over the roller $l$. The opening between the ends of the forked member is then free and the vehicles may be separated.

The coupling-bow $f$ is, at the part remotest from the vehicle, provided on the outside with a rounded portion corresponding to the recess $n$ which is adapted to accommodate the bolt $a$. The rounded outside portion bears on the bolt $c$. This arrangement and the provision of stops $o$ on the bow prevent lateral movement thereof in all positions of the coupling.

I claim:—

1. An automatic coupling for motor-cars comprising two bolts arranged one in front of the other, the rear bolt being slidable in a vertical plane and the front bolt being pivotally mounted at its upper end on a horizontal axis to swing upwardly and rearwardly when struck by the coupling member on the car to be attached to said coupling, and means operative on such swinging movement of the front bolt to lift the rear bolt so as to permit the coupling member to pass to a position behind the front bolt, said bolts being automatically movable back into their locking positions, one in front and one in rear of the coupling member.

2. An automatic coupling for motor-cars as claimed in claim 1, in which the front bolt is provided with a projection to engage and lift the rear bolt when the former is acted upon by the coupling member of the vehicle to be attached.

3. An automatic coupling for motor-cars as claimed in claim 1, in which a bow shaped coupling member is provided for coaction with the bolts of said automatic coupling, said member having a recess in its inner surface adapted to engage the front bolt when in coupled position and an opposed outer curved surface with terminal stops to prevent lateral play of said member.

In testimony whereof I affix my signature.

CARL AHLBORN.